(12) United States Patent
Orley et al.

(10) Patent No.: US 12,075,809 B1
(45) Date of Patent: Sep. 3, 2024

(54) SPROUTED NUT PROCESSING METHOD

(71) Applicant: Daily Crunch Inc., Nashville, TN (US)

(72) Inventors: Patricia Diane Orley, Birmingham, MI (US); Laurel Kozeradsky Orley, Nashville, TN (US)

(73) Assignee: Daily Crunch, Inc., Nashville, TN (US)

( * ) Notice: Subject to any disclaimer, the term of this patent is extended or adjusted under 35 U.S.C. 154(b) by 65 days.

(21) Appl. No.: 17/510,427

(22) Filed: Oct. 26, 2021

(51) Int. Cl.
*A23L 19/00* (2016.01)
*A23N 5/00* (2006.01)

(52) U.S. Cl.
CPC .................................. *A23N 5/002* (2013.01)

(58) Field of Classification Search
CPC ...................................................... A23N 5/002
USPC .......................................................... 426/482
See application file for complete search history.

(56) References Cited

FOREIGN PATENT DOCUMENTS

| | | | |
|---|---|---|---|
| CN | 103461633 A | * | 12/2013 |
| PH | 12015000427 A1 | * | 12/2015 |
| TR | 201910687 A2 | * | 7/2019 |

OTHER PUBLICATIONS

Translation of CN-103461633-A (Year: 2013).*
Fabunmi et al., Effects of tuber size, soaking hours and sprouting media on sprouting of tiger nut (*Cyperus esculentus* L. var. *sativa*) tubers, Acta agriculturae Slovenica, Sep. 2016. (Year: 2016).*
Translation of TR-201910687-A2 (Year: 2019).*

* cited by examiner

*Primary Examiner* — Brent T O'Hern
(74) *Attorney, Agent, or Firm* — Bradley Arant Boult Cummings LLP; Jacob W. Neu; Lucas R. Yordy

(57) ABSTRACT

A process for preparing crunchy sprouted nuts and the resulting nuts of such process are disclosed herein. The nuts are submerged and soaked in water for a period of 24-48 hours. Then the nuts are drained and rinsed and allowed to dry for a period of 20-60 minutes. Next the nuts are dehydrated for a period of 24-48 hours. The result is a particularly crunchy sprouted nut.

15 Claims, No Drawings

SPROUTED NUT PROCESSING METHOD

BACKGROUND OF INVENTION

Nuts are a popular food source across the world. Nuts may be eaten dried or sprouted, i.e., the germ of the nut is permitted to germinate for a period of time before consumption. However, because sprouting requires soaking in water or otherwise being wrapped in wet cloth, sprouted nuts are typically not as crunchy as conventionally dried nuts. Consumers tend to prefer crunchy nuts. What is needed is a nut processing method that prepares a crunchy sprouted nut.

BRIEF SUMMARY OF INVENTION

In some embodiments the invention is directed to a process for preparing sprouted nuts with the steps of submersing nuts in water; soaking the nuts for a period of 24-48 hours; draining and rinsing the nuts; allowing the nuts to stand at ambient atmosphere for 20-60 minutes; dehydrating the nuts in a single layer in a dehydrator for a period of 24-48 hours at 140-160 degrees Fahrenheit; allowing the nuts to cool; and packaging the nuts.

In other embodiments, the invention directed to the nuts prepared by the above process.

Other embodiments will be identifiable to a person of ordinary skill in the art based on the entirety of the disclosure.

DESCRIPTION OF THE INVENTION

The following disclosure is directed to a preparation process for producing sprouted nuts for human consumption. In some embodiments the nuts may be any sprouted nut that is edible by humans. Nuts may be classified as botanical nuts (i.e., "true" nuts), drupes, gymnosperms, and angiosperms. Botanical nuts are dry and hard-shelled and have uncompartmented fruit. Common edible botanicals include chestnuts, hazelnuts, and kola nuts. Drupes have a hard pit (or stone) surrounded by a fleshier fruit. Common edible drupes include almonds, cashews, bread nuts, pistachios, and walnuts. Nut-like gymnosperm seeds are seeds lacking a hard enclosure. A common edible gymnosperm is a pine nut. Finally, nut-like angiosperm seeds are seeds surrounded by a pod or fruit. Common edible angiosperms include peanuts, Brazil nuts, and macadamia nuts.

To prepare the nuts for sprouting and consumption, the steps may be taken.

First, a desired quantity of nuts is placed in a bowl, vat, bin, or other container and covered with room temperature water. As the nuts will typically expand during soaking, enough water should be added to the container to keep the nuts fully submerged even as they expand. If it is determined that insufficient water was added to the container initially, more water may be added to maintain the soaked nuts under full submersion The nuts are covered and soak for a period of between 24 hours and 48 hours.

After the soak, the nuts are drained in a colander and rinsed. After rinsing, the nuts may be allowed to sit and dry at ambient atmosphere for a period of 20-60 minutes.

Next, the nuts are spread out in a single layer on trays for dehydration. The nuts should not overlap or be stacked or piled upon each other in any way. The trays of nuts are placed in a dehydrator. The dehydrator may be set to dehydrate at temperatures of about 140-160 degrees Fahrenheit. The nuts may be dehydrated for a period between 24 hours to 48 hours.

After dehydration, the nuts are allowed to cool. They may then be bagged or placed in an air-tight container for storage or sale.

The methods described above may be used with any of the types of nuts described above. It has been found that the preparation processes described herein may produce drupaceous sprouted nuts, such as almonds, that are particularly crunchy. The differentiated crunch is believed to be attributable to the dehydrated sprouted nut that results from the soaking process and the dehydrating process together. During the soaking process, the nuts absorb water and swell visibly in size compared to raw nuts. While nuts can begin the germination process within 8 hours to 10 hours of soaking, the nuts in the disclosed process are soaked longer, for a period between 24 hours and 48 hours. This allows the nuts to swell to their maximum potential and results in a hollow center. Then, the sprouted nuts are dehydrated, which removes excess moisture but allows the nuts to maintain their size. Because the nuts are soaked for a longer period and are dehydrated after their removal from the soaking process, the dehydrated nuts maintain their large appearance and hollow center that contributes to their unique crunch.

It is to be understood that the above-described processes are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

The claimed invention is:

1. A process for preparing and packaging sprouted nuts for human consumption, consisting of:
   a) submersing nuts in water;
   b) soaking the nuts for a soaking period of 24-48 hours to sprout the nuts, resulting in sprouted nuts;
   c) draining and rinsing the sprouted nuts;
   d) allowing the sprouted nuts to stand at ambient atmosphere for a drying period of 20-60 minutes;
   e) dehydrating the sprouted nuts in a single layer in a dehydrator for a dehydrating period of 24-48 hours at a dehydrating temperature of 140-160 degrees Fahrenheit;
   f) allowing the sprouted nuts to cool; and
   g) packaging the sprouted nuts.

2. The process of claim 1, wherein the soaking period is 40-48 hours.

3. The process of claim 2, wherein the soaking period is 48 hours.

4. The process of claim 1, wherein the soaking period is 24-30 hours.

5. The process of claim 1, wherein the soaking period is 30-40 hours.

6. The process of claim 1, wherein the drying period is 50-60 minutes.

7. The process of claim 1, wherein the drying period is 40-50 minutes.

8. The process of claim 1, wherein the drying period is 30-40 minutes.

9. The process of claim 1, wherein the drying period is 20-30 minutes.

10. The process of claim 1, wherein the dehydrating period is 40-48 hours.

11. The process of claim 1, wherein the dehydrating period is 48 hours.

12. The process of claim 1, wherein the dehydrating period is 24-30 hours.

13. The process of claim 1, wherein the dehydrating period is 30-40 hours.

14. The process of claim 1, wherein the dehydrating temperature is 140 degrees Fahrenheit.

15. The process of claim 1, wherein the dehydrating temperature is 160 degrees Fahrenheit.

\* \* \* \* \*